United States Patent
Allidieres

(10) Patent No.: US 9,845,917 B2
(45) Date of Patent: Dec. 19, 2017

(54) GAS FILLING METHOD AND STATION

(71) Applicant: L'Air Liquide, Societe Anonyme pour l'Etude et l'Exploitation des Procedes Georges Claude, Paris (FR)

(72) Inventor: Laurent Allidieres, Saint Martin d'Uriage (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 153 days.

(21) Appl. No.: 14/904,266

(22) PCT Filed: May 13, 2014

(86) PCT No.: PCT/FR2014/051104
§ 371 (c)(1),
(2) Date: Jan. 11, 2016

(87) PCT Pub. No.: WO2015/004344
PCT Pub. Date: Jan. 15, 2015

(65) Prior Publication Data
US 2016/0169449 A1    Jun. 16, 2016

(30) Foreign Application Priority Data
Jul. 11, 2013 (FR) .................................... 13 56806

(51) Int. Cl.
*F17C 5/06* (2006.01)
*F17C 5/00* (2006.01)

(52) U.S. Cl.
CPC ................ *F17C 5/06* (2013.01); *F17C 5/007* (2013.01); *F17C 2205/0326* (2013.01);
(Continued)

(58) Field of Classification Search
CPC .......... Y02E 60/321; F17C 5/06; F17C 5/007; F17C 2270/0139; F17C 2265/065;
(Continued)

(56) References Cited

U.S. PATENT DOCUMENTS 5,916,247 A * 6/1999 Castellanet ......... C01B 23/0036
62/50.2
8,986,426 B2 * 3/2015 Sommier ............... B01D 53/02
128/204.18
(Continued)

FOREIGN PATENT DOCUMENTS

FR    2 919 375    1/2009
FR    2 973 858    10/2012
(Continued)

OTHER PUBLICATIONS

International Search Report and Written Opinion for PCT/FR2014/051104, dated Feb. 5, 2015.
(Continued)

*Primary Examiner* — Timothy L Maust
*Assistant Examiner* — Andrew Schmid
(74) *Attorney, Agent, or Firm* — Christopher J. Cronin

(57) ABSTRACT

A method for filling at least one buffer container of a hydrogen filling station, the station comprising a fluid circuit linked to said at least one buffer container, the circuit of the filling station comprising a first end linked to at least one source of hydrogen gas, the circuit comprising a second end provided with a transfer conduit intended to be removably connected to a tank, the method being characterized in that it comprises a step of determining the current concentration of at least one impurity in the hydrogen in the buffer container during the filling of same, a step of comparing said current concentration of the impurity relative to a predefined threshold concentration and, when the current concentration (Continued)

of the at least one impurity reaches said threshold concentration, stopping the filling of said buffer container.

17 Claims, 1 Drawing Sheet

(52) U.S. Cl.
CPC  *F17C 2221/012* (2013.01); *F17C 2223/0123* (2013.01); *F17C 2223/033* (2013.01); *F17C 2225/0123* (2013.01); *F17C 2225/036* (2013.01); *F17C 2227/0157* (2013.01); *F17C 2227/0185* (2013.01); *F17C 2227/043* (2013.01); *F17C 2250/01* (2013.01); *F17C 2250/032* (2013.01); *F17C 2250/043* (2013.01); *F17C 2250/046* (2013.01); *F17C 2250/0443* (2013.01); *F17C 2250/0452* (2013.01); *F17C 2250/0647* (2013.01); *F17C 2250/0657* (2013.01); *F17C 2250/0694* (2013.01); *F17C 2260/056* (2013.01); *F17C 2265/065* (2013.01); *F17C 2270/0139* (2013.01); *Y02E 60/321* (2013.01); *Y02E 60/324* (2013.01)

(58) Field of Classification Search
CPC ........ F17C 2260/056; F17C 2250/0694; F17C 2250/0657; F17C 2250/0647; F17C 2250/06457; F17C 2250/046; F17C 2250/0452; F17C 2250/0443; F17C 2250/043; F17C 2250/032; F17C 2227/043; F17C 2227/0185; F17C 2227/0157
See application file for complete search history.

(56) References Cited

U.S. PATENT DOCUMENTS

| | | | | |
|---|---|---|---|---|
| 9,061,240 | B2* | 6/2015 | Sommier | B01D 53/30 |
| 9,433,888 | B2* | 9/2016 | Kulkarni | B01D 53/226 |
| 9,539,672 | B2* | 1/2017 | Rodrigues | B23K 35/38 |
| 9,618,203 | B2* | 4/2017 | Kang | F23L 15/04 |
| 2005/0287407 | A1* | 12/2005 | Bushko | H01M 8/04089 141/82 |
| 2006/0150640 | A1* | 7/2006 | Bishop | F17C 1/007 62/53.1 |
| 2009/0107577 | A1* | 4/2009 | Allidieres | F17C 5/007 141/1 |
| 2009/0151812 | A1* | 6/2009 | Allidieres | F17C 5/007 141/11 |
| 2009/0229701 | A1* | 9/2009 | Allidieres | F17C 5/06 141/2 |
| 2010/0193070 | A1* | 8/2010 | Allidieres | F17C 5/06 141/11 |
| 2016/0146400 | A1* | 5/2016 | Allidieres | F17C 5/007 141/4 |
| 2016/0169449 | A1* | 6/2016 | Allidieres | F17C 5/007 141/4 |
| 2016/0223510 | A1* | 8/2016 | Carteau | G01N 1/2035 |

FOREIGN PATENT DOCUMENTS

| | | |
|---|---|---|
| WO | WO 2006 031 365 | 3/2006 |
| WO | WO 2006 065 673 | 6/2006 |

OTHER PUBLICATIONS

French Search Report and Written Opinion for FR 1 356 806, dated Apr. 2, 2014.

* cited by examiner

GAS FILLING METHOD AND STATION

CROSS-REFERENCE TO RELATED APPLICATIONS

This application is a §371 of International PCT Application PCT/FR2014/051104, filed May 13, 2014, which claims §119(a) foreign priority to French patent application FR1356806, filed Jul. 11, 2013.

BACKGROUND

Field of the Invention

The present invention relates to a filling method and station.

The invention relates more particularly to a method of filling at least one buffer container of a filling station with pressurized gaseous hydrogen, the filling station comprising at least one buffer container and a fluid circuit connected to said at least one buffer container, the circuit of the filling station comprising a first end connected to at least one source of gaseous hydrogen for carrying out the filling of the at least one buffer container with gas originating from the source, the circuit comprising a second end equipped with a transfer pipe intended to be removably connected to a tank, in order to fill said tank from the at least one buffer container.

Related Art

The fast filling (that is to say typically less than 15 minutes) of (hydrogen) gas tanks of vehicles is generally carried out by successive pressure equalizations. That is to say that buffer containers storing gas at increasing high pressures (for example 200, 300, 450 or 850 bar) are successively placed in fluidic communication with the tank to be filled.

These methods are described abundantly in the literature. Reference may for example be made to documents FR 2919375 A1, FR 2973858 A1 and FR 2919375 A1 that describe filling stations to which the present invention may apply.

The hydrogen of the tanks of such vehicles is generally provided in order to supply a fuel cell. The fuel cells (in particular of "PEMFC" type) must be supplied with a very "pure" hydrogen gas. Indeed, a wealth of literature describes the negative impacts of impurities (such as chemical species, water, CO, $H_2S$) in the hydrogen in terms of performance and service life of the fuel cells.

Strict standards have been developed to ensure that the hydrogen delivered to the tanks does not damage the cells (cf. for example the ISO 14687-2 standard).

The standards of industrial gases obtained by virtue of known and relatively inexpensive manufacturing processes do not make it possible to ensure such a degree of purity. It is generally acknowledged that in order to guarantee hydrogen purities that are always compatible with the requirements of fuel cells, it is necessary to add, upstream of the filling stations, steps for purifying the hydrogen gas produced industrially. These purification steps are however expensive (for example purifications over a bed of adsorbent operating at cryogenic temperature or with palladium membranes).

Thus, in order to guarantee a hydrogen purity in accordance with the specifications of fuel cells, one known solution consists in supplying the filling station with liquid hydrogen. This hydrogen is by definition very pure since its temperature (of the order of 20 K) makes all the impurities precipitate in solid form. Another solution consists in using hydrogen purified with adsorber purifiers that operate at a cryogenic temperature. Another solution consists in using hydrogen originating directly from an electrolyzer followed by a step of deoxidation over a catalyst bed and of drying over an adsorbent.

These solutions generally also result in a large additional cost (additional cost of 40% to 100% relative to the cost of the hydrogen produced industrially).

Another known solution uses a gas analyzer installed upstream of the compressors of the filling station in order to verify the purity of the gas. When a threshold of impurities is exceeded in the gas supplied to the compressor, the inlet valves of the compressor(s) are closed which causes the shutdown of the compressor. The filling station is then in degraded mode (filling capacities deliberately reduced in order to conserve operational autonomy). The restarting of the compressor is then in most cases a manual operation, requiring the presence of an operator on site. Furthermore, if the station is supplied by a source of gas that originates from an on-site or decentralized generator, the impure hydrogen (i.e. not in accordance with the specifications) is then emitted into the air in order to allow the system to recover a nominal degree of purity by acting automatically or manually on the hydrogen production parameters. This gives rise to energy wastage.

SUMMARY OF THE INVENTION

One object of the present invention is to alleviate all or some of the abovementioned disadvantages of the prior art.

For this purpose, the method according to the invention, furthermore in accordance with the generic definition given in the preamble above, is essentially characterized in that it comprises a step of determining the current concentration of at least one impurity in the hydrogen in the buffer container during the filling thereof, a step of comparing said current concentration of the impurity with respect to a given concentration threshold and, when the current concentration of the at least one impurity reaches said concentration threshold, a stopping of the filling of said buffer container.

Moreover, some embodiments of the invention may comprise one or more of the following features:

- the step of determining the current concentration of at least one impurity comprises a measurement by sensor(s) of the concentration of the impurity in the at least one source of hydrogen and/or in the fluid circuit of the filling station and a determination of the amount of gas transferred in real time into the buffer container during the filling of the latter,
- the determination of the amount of gas transferred in real time into the buffer container during the filling thereof comprises at least one from among: a measurement by a flowmeter in the circuit and a measurement of the pressure variation in the buffer container during the filling of the latter,
- the method comprises a step of memorizing said determined current concentration, the step of determining the current concentration of at least one impurity in the hydrogen in the buffer container during a filling taking into account the residual concentration of impurity in the buffer container determined during the previous filling,
- the filling station comprises several buffer containers filled with gaseous hydrogen pressurized to different pressures,
- after filling, the buffer containers are used successively in order of increasing pressure so as to fill a tank (8) via successive pressure equalizations, the at least one source of hydrogen comprises at least one from among: a network of hydrogen gas at a pressure between 1.3 bar abs and 200 bar abs and a component for producing hydrogen, the component for producing hydrogen comprises at least one from among: an electrolyzer, a natural gas reformer, a methanol cracking device, an autothermal reforming device and a partial oxidation device, the at least one impurity comprises at least one from among: carbon monoxide, water, at least one sulfur-containing or halogenated compound, $CO_2$, nitrogen, helium, $NH_3$, at least one hydrocarbon, $O_2$ and argon, the at least one impurity comprises carbon monoxide, the concentration threshold being between 0.1 ppm and 10 ppm and preferably between 0.1 ppm and 0.3 ppm, the at least one impurity comprises water and in that the concentration threshold is between 1 ppm and 100 ppm and preferably between 3 ppm and 7 ppm, the filling station comprising at least one compression component for compressing gaseous hydrogen supplied to the buffer container or to the tank, after stopping the filling of said buffer container due to a current concentration of the impurity at the level of the threshold, the method comprises a step of filling another buffer container, that is to say that the transfer of gas originating from the source is switched to another buffer container according to the same procedure, after stopping the filling of said buffer container due to a current concentration of the impurity at the level of the threshold, the filling of this same buffer container is only restarted when the concentration of impurity in the gas from the source supplied again becomes lower than the concentration of impurity in the buffer container, the method comprises a step of temporary intermediate storage of the gas supplied by the at least one source before the supply thereof to the buffer container in order, where necessary, to wait for the availability of the determination of the current concentration before filling the buffer container, the circuit of the filling station comprises an intermediate gas storage positioned between the at least one source and the at least one buffer storage in order, when necessary, to synchronize the filling of the buffer container with the information available from the component for determining the current concentration of impurity, the intermediate storage is located between a component for determining the current concentration and a valve adjacent to the component for determining the current concentration, the filling station comprises three buffer containers intended for storing hydrogen pressurized to respective pressures, for example respectively between 150 and 350 bar, 350 and 700 bar, 700 bar and 850 bar, the station comprises at least one cooling exchanger in heat exchange with the gas intended to be supplied to the tank and/or to a buffer container, the electronic logic controller comprises a system for acquiring and processing data, the electronic logic controller comprises a data memory that stores the current concentration of impurity (impurities) in the at least one buffer container by updating at each filling.

The invention may also relate to a filling station for a pressurized gaseous hydrogen tank comprising at least one buffer container provided in order to contain pressurized gaseous hydrogen, a fluid circuit comprising a plurality of valves and an electronic logic controller for controlling the filling station and in particular for controlling at least one valve, the circuit being connected to said at least one buffer container and comprising a first end intended to be connected to at least one source of gaseous hydrogen for enabling the filling of the at least one buffer container with the gas supplied by the at least one source, the fluid circuit comprising a second end comprising a filling pipe intended to be removably connected to a tank in order to fill said tank from the at least one buffer container, the station comprising at least one component for determining the current concentration of at least one impurity in the hydrogen in the buffer container during the filling thereof, the electronic logic controller being adapted:

in order to receive and/or calculate the current concentration of impurity determined by the determining component, in order to compare said current concentration of the impurity with respect to a predetermined concentration threshold and, when the current concentration of the at least one impurity reaches said concentration threshold, stopping the filling of said buffer container.

According to other possible specific features:

the component for determining the current concentration comprises at least one sensor of the concentration of the impurity in the at least one source of hydrogen and/or in the fluid circuit of the filling station and at least one component for determining the amount of gas transferred in real time into the buffer container during the filling of the latter, the component for determining the amount of gas transferred into the buffer container comprises at least one from among: a flowmeter located in the circuit and a sensor for measuring the pressure in the buffer container.

The invention may also relate to any alternative device or method comprising any combination of the features above or below.

BRIEF DESCRIPTION OF THE FIGURES

Other specific features and advantages will become apparent from reading the following description given with reference to the figures in which.

DETAILED DESCRIPTION OF THE INVENTION

Figure 1:
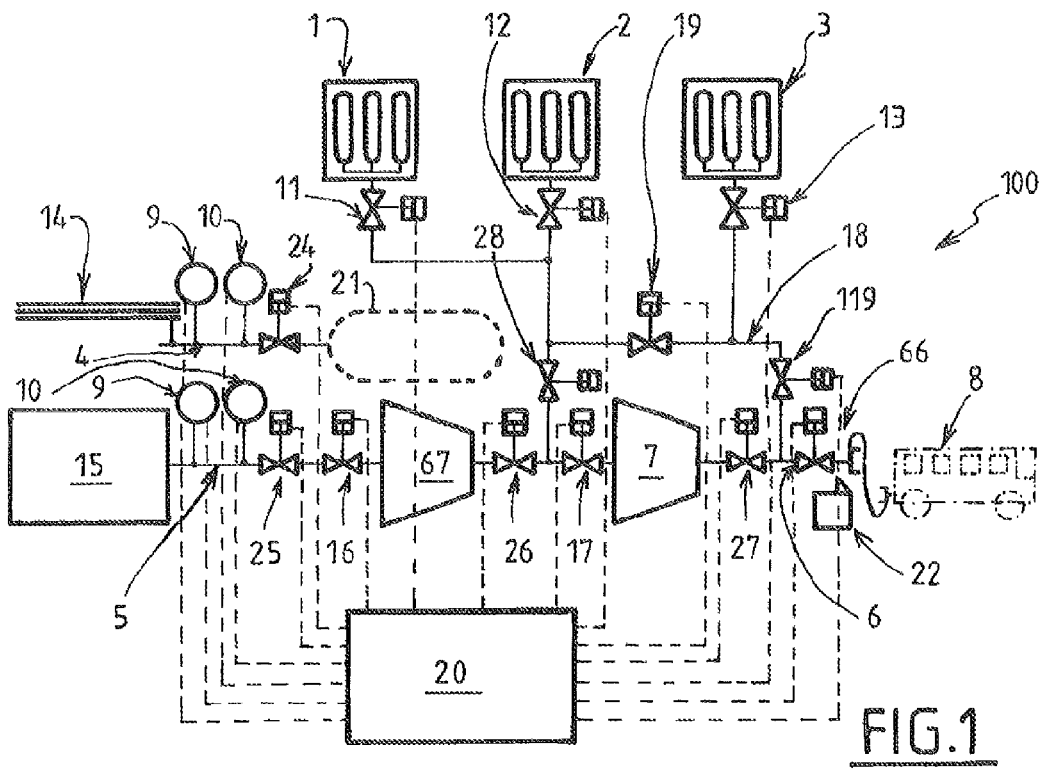
FIG. 1 which represents a schematic and partial view illustrating the structure and the operation of a filling station according to one possible exemplary embodiment of the invention.

The filling station 100 represented by way of nonlimiting example is a station provided in order to carry out the filling of tanks 8 of gaseous hydrogen at high pressure (for example at a pressure between 300 and 850 bar).

Conventionally, the filling station 100 comprises several buffer containers 1, 2, 3 (three in this nonlimiting example).

Each buffer container 1, 2, 3 is a tank or set of tanks provided in order to contain gaseous hydrogen pressurized to a given pressure. The station 100 comprises a fluid circuit 11, 12, 13, 4, 5, 6 comprising a plurality of pipes and valves. The circuit 11, 12, 13, 4, 5, 6 is connected to the buffer containers 1, 2, 3. The circuit comprises a first end 4, 5 intended to be connected to at least one source 14, 15 of gaseous hydrogen in order to enable the filling of the at least one buffer container 1, 2, 3 with gas originating from the at least one source 14, 15.

The source(s) 14, 15 of hydrogen may conventionally comprise at least one from among: a network 14 of hydrogen gas at a pressure between 1.3 bar abs and 200 bar abs and a component 15 for producing hydrogen such as an electrolyzer, a natural gas reformer ("SMR"), a methanol cracking device, an autothermal reforming ("ATR") device, a partial oxidation ("PDX") device, etc.

The circuit 11, 12, 13, 4, 5, 6 comprises a second end equipped with at least one filling pipe 6 intended to be removably connected (via an appropriate connector 66) to a tank 8 to be filled.

More specifically, the buffer containers 1, 2, 3 are connected in parallel, via respective valves 11, 12, 13, to the filling pipe 6.

Similarly, one, two or more than two gas sources 14, 15 may be connected in parallel via respective valves 24, 25 to the filling pipe 6.

The filling pipe 6 may comprise, upstream of the connector 66, one or, as represented in this example, two compressors 67, 7. The two compressors 67, 7 may be positioned in series and each equipped with a respective upstream valve 16, 26 and with a respective downstream valve 17, 27. As represented, a bypass pipe 18 for bypassing the downstream compressor 7 (connector 66 side) may be provided. The bypass pipe 18 may comprise two valves 19 and 119 and may be the collecting pipe that connects the buffer containers 1, 2, 3 to the filling pipe 6. This bypass pipe 18 also enables the filling of the buffer containers 1, 2, 3 via the compressor(s) 67, 7.

Furthermore, as illustrated by dotted lines, a buffer tank 21 may be optionally provided concurrently with the filling pipe 6 in order to store gases from the sources before the compression thereof. Finally, in a manner known per se and as represented schematically, a cooling system 22 (heat exchanger, etc.) for cooling the gas transferred to the tank 8 may be optionally provided in the circuit, for example in the downstream portion of the filling pipe 6.

In a known manner, such an architecture makes it possible to fill the buffer tanks 1, 2, 3 at given pressures by compressing the gas supplied by one or more sources 14, 15 of hydrogen. The buffer containers 1, 2, 3 may then be used to fill the tank 8 by "cascade filling". Where necessary, the compressor(s) 67, 7 may supplement or complement these pressure equalization phases (reference may be made for example described in the documents cited above).

The station 100 may comprise an electronic logic controller 20 for controlling the filling station, the electronic logic controller 20 may in particular control at least one valve of the circuit, for example a gas inlet valve for gas entering the compressor 67, 7 and/or a switch of the compressor(s) 67, 7. The electronic logic controller 20 comprises, for example, a microprocessor that carries out memory and computational functions and, if necessary, a user interface.

According to one advantageous specific feature, the station 100 makes it possible to determine the current concentration of at least one impurity in the hydrogen with which the buffer containers 1, 2, 3 are filled. More specifically, the concentration of impurities in the buffer container(s) 1, 2, 3 is measured and/or calculated continuously during the filling of these containers. Furthermore, when this concentration of impurity reaches a given threshold (for example the maximum specification tolerated by the downstream use (a fuel cell supplied by the tanks 8 to be filled), the filling of the buffer container 1, 2, 3 is stopped. In this way, the filling station 100 can guarantee a predefined hydrogen purity.

In this way, the invention makes it possible to benefit from the dilutability of the impurities permitted by the buffer containers 1, 2, 3. The shutdown of the compressor 67, 7 and/or the closure of the valves and/or the stopping of the filling of the buffer containers is thus only carried out when the total amount of impurities introduced into the buffer containers 1, 2, 3 is above a threshold that would lead to an unacceptable impurity level in the tank 8 (out of specification).

This solution makes it possible to absorb the quantities of momentarily impure gas. Indeed, generally the impurity of the hydrogen supplied by sources 14, 15 is the result of a momentary failure of the production means upstream.

That is to say that the hydrogen therefore contains sporadic "surges" of impurities. The industrial processes for producing or purifying hydrogen all have means for automatically controlling the purity of hydrogen and bringing the hydrogen back to specifications. For example, in the case of purification via PSA, this is carried out by reduction of the adsorber production time, at equivalent flow rate.

The invention makes it possible to absorb these occasional impurities without calling into question the purity specifications of hydrogen supplied to the tank 8 downstream and while reducing or eliminating hydrogen wastage.

Determining the current concentration of at least one impurity may be carried out by a measurement 9 by at least one sensor of the concentration of the impurity. For example, the sensor comprises a gas analyzer that measures a concentration of the chemical species (impurity) in a sample of gas. As illustrated in FIG. 1, this or these sensor(s) are symbolized by the reference 9 and may be positioned in the source 14, 15 of hydrogen and/or in the fluid circuit of the filling station 100, upstream of the compressors 67, 7. A sensor 10 (flowmeter for example) may also be provided in order to determine the amount of gas transferred in real time into the buffer container 1, 2, 3 during the filling of the latter.

Thus, the concentration of impurity and the amount of gas supplied may be measured continuously at the inlet of the filling station 100. The concentration of impurity may therefore be calculated from the concentration of impurity in the gas introduced into the buffer container and also the amount of gas introduced into the buffer container. This concentration may be measured or given by the source. The quality of gas may be measured by any conventional process (flowmeter in particular). Alternatively or in combination, this concentration may be measured directly in the buffer container (via appropriate sensor(s) and analyzer(s)).

The portion of pipe 4 (respectively 5) of the first end of the circuit between the flow rate sensor 10 and the corresponding adjacent valve 24 (respectively 25) may be sized with a given volume so that the residence time of the gas between the concentration sensor 9 and the adjacent valve 24, 25 is greater than the response time of said concentration sensor 9.

Figure 2:
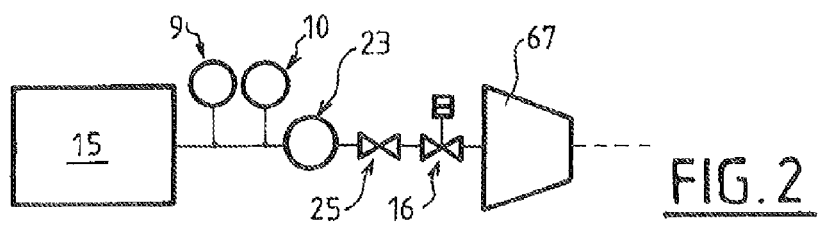
FIG. 2 represents a schematic and partial view of a detail of the station from FIG. 1 according to another possible embodiment.

As described below with reference to FIG. 2, alternatively or in combination, this residence time may also be obtained by a pressurized storage 23 positioned between the flow rate sensors 9, 10 and the adjacent valve 24 (respectively 25) located downstream.

For example, the concentration "q" of an impurity as a function of the time "t" may be calculated or measured for each filling numbered "k" with k=1, 2, 3 . . . and for each buffer container numbered i, with i=1, 2, 3 according to the expression $q_i^k(t)$.

Figure 3:
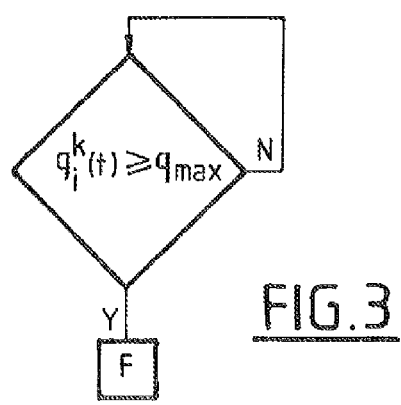
FIG. 3 represents a schematic and partial view illustrating the general operating principle of the invention.

This concentration $q_i^k(t)$ should not be greater than a threshold $q_{max}$ which is for example the maximum value of the content of impurity in the specification of the gas (cf. FIG. 3 when this concentration reaches the threshold $q_{max}$, "Y" the filling is interrupted "F", otherwise "N" the filling continues).

This concentration q may be memorized for each filling k and each tank i. The concentration of impurity is calculated in particular at the end of the filling step, when the pressure P in the buffer container 1 has reached its maximum threshold PMAX (or if the filling is interrupted beforehand for another reason).

For each filling step k of the buffer container i the amount of impurity $q_i^k(t)$ (for example in ppm) may be calculated according to the following formula:

$$q_i^k(t) = q_i^{k-1}(PMAX) + \frac{\int_{x=0}^{x=t} FT(x) \cdot AT(x) \cdot dx}{\int_{x=0}^{x=t} FT(x) \cdot dx}$$

That is to say that the residual amount of impurity calculated or known beforehand (left-hand term) is added to the current amount of impurity (integration of the content of impurity and of the compression flow rate according to the right-hand term).

In which t represents the time of the filling step, FT(x) is the total mass or molar flow rate of gas measured by the sensor 10 or calculated, and AT(x) is the mass or molar concentration of impurity at the instant x.

The mass flow rate FT(x) is preferably measured by a flowmeter 10 as illustrated in FIG. 1. This gas flow rate may of course be measured at the inlet side or at the outlet side of a compressor 67, 7.

Of course, this mass flow rate may alternatively be calculated by measuring the increase in pressure in the containers 1, 2, 3 (by measuring the pressure in or at the inlet to the buffer container), according to the following formula:

$$FT(x) = \frac{\partial \left( \frac{PV}{ZRT} \right)}{dx},$$

P and T being the pressure and the temperature (measured or estimated) in the buffer container number i, Z being the coefficient of compressibility at the pressure P of the hydrogen, R the ideal gas constant and x the time.

In this configuration, the filling of the buffer container number i (i=1, 2 or 3) may be stopped at the pressure P=PMAX when $q_i^k(t) \geq q_{max}$ (gas out of specification) or when the pressure in the buffer container i reaches the maximum allowable operating pressure (buffer container full).

The station 100 then switches and fills the next buffer container i+1 according to the same principle.

The filling of the buffer container i during a subsequent filling cycle k+1 may resume only when the pressure in the buffer container i is below the maximum operating pressure and when the reading of $AT < q_{max}$, that is to say that the hydrogen supplied by the source 14, 15 has become again of good quality in order to be able to "clean up" the buffer container (that is to say lower the concentration of pollutant in the buffer container).

The filling station 100 may thus calculate and manage, in the buffer containers 1, 2, 3, the dilution of the occasional impurities in the source 14, 15.

The shutdown of the station 100 is thus no longer carried out on a criterion of purity of the gas at the inlet of the station 100, but on a criterion of purity of gas in the buffer containers 1, 2, 3 themselves (which is measured and calculated).

The impurity or impurities taken into account may comprise for example at least one from among: carbon monoxide (CO), water ($H_2O$), sulfur-containing or halogenated compounds, $CO_2$, nitrogen, helium, $NH_3$, hydrocarbons, $O_2$ and argon.

Generally, any measurable impurity may be taken into account and the maximum threshold of each impurity may be selected or modified as a function of the purity specifications downstream (on the side of the gas user).

For example, one impurity taken into account may be carbon monoxide CO and the concentration threshold may be between 0.1 ppm and 10 ppm and preferably between 0.1 ppm and 0.3 ppm, for example 0.2 ppm. In the case of the $H_2O$ (water) impurity, the concentration threshold may be between 1 ppm and 100 ppm and preferably between 3 ppm and 7 ppm, for example 5 ppm.

As illustrated in FIG. 1, all or some of the steps of calculating, memorizing, comparing and controlling the filling may be carried out by the electronic logic controller 20. For this purpose, the logic controller 20 may be connected (optionally wirelessly) to the components of the filling station 100.

Of course, the invention is not limited to the exemplary embodiment described above. For example, and as illustrated in FIG. 2, the calculation of the concentration of impurity may be carried out at a storage 23 of low-pressure gas installed between the sensors 9, 10 and a compressor 67. The elements identical to those described previously are denoted by the same references and are not described again.

As explained above, this may make it possible to store the gas before filling the buffer containers 1, 2, 3 in order to avoid a time lag between the analysis time of the sensor(s) 9, 10 and the introduction of gas into the buffer containers 1, 2, 3.

It is therefore easily understood that the invention makes it possible to use one or more sources of hydrogen, the purity characteristics of which are not continuously constant, without however requiring an expensive pre-purification system and without requiring untimely shutdowns of the station.

In the case where the price of the hydrogen supplied by sources varies as a function of its purity, the station according to the invention makes it possible to stock up at a lower cost.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur, The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for filling at least one buffer container of a filling station with pressurized gaseous hydrogen, the filling station comprising at least one buffer container and a fluid circuit connected to said at least one buffer container, the circuit of the filling station comprising a first end connected to at least one source of gaseous hydrogen for carrying out the filling of the at least one buffer container with gas originating from the source, the circuit comprising a second end equipped with a transfer pipe intended to be removably connected to a tank, in order to fill said tank from the at least one buffer container with gaseous hydrogen having a concentration of at least one given impurity that is below a given concentration threshold, the method comprising the steps of:
   filling said buffer container with the hydrogen;
   determining a current concentration of at least one impurity in the hydrogen in the buffer container during the filling thereof; and
   comparing said current concentration of the impurity with respect to a given concentration threshold; and
   when the current concentration of the at least one impurity reaches said concentration threshold, stopping the filling of said buffer container.

2. The method of claim 1, wherein the step of determining the current concentration of at least one impurity comprises a measurement by sensor(s) of the concentration of the impurity in the at least one source of hydrogen and/or in the fluid circuit of the filling station and a determination of the amount of gas transferred in real time into the buffer container during the filling of the latter.

3. The method of claim 2, wherein the determination of the amount of gas transferred in real time into the buffer container during the filling thereof comprises at least one from among: a measurement by a flowmeter in the circuit and a measurement of the pressure variation in the buffer container during the filling of the latter.

4. The method of claims 1, further comprising memorizing the residual current concentration of impurity in the buffer container determined during a previous filling of the buffer container, wherein, the step of determining the current concentration of at least one impurity in the hydrogen in the buffer container during a subsequent filling adds the residual concentration of impurity in the buffer container determined during the previous filling to the concentration of impurity added to the buffer container during the subsequent filling.

5. The method of claim 1, wherein the filling station comprises several buffer containers filled with gaseous hydrogen pressurized to different pressures.

6. The method of claim 5, wherein, after filling, the buffer containers are used successively in order of increasing pressure so as to fill the tank via successive pressure equalizations.

7. The method of claim 1, wherein at least one source of hydrogen comprises at least one from among: a network of hydrogen gas at a pressure between 1.3 bar absolute and 200 bar absolute and a component for producing hydrogen.

8. The method of claim 7, wherein the component for producing hydrogen comprises at least one from among: an electrolyzer, a natural gas reformer ("SMR"), a methanol cracking device, an autothermal reforming ("ATR") device and a partial oxidation ("POX") device.

9. The method of claim 1, wherein at least one impurity comprises at least one from among: carbon monoxide (CO), water ($H_2O$), at least one sulfur-containing or halogenated compound, $CO_2$, nitrogen, helium, $NH_3$, at least one hydrocarbon, $O_2$ and argon.

10. The method of claim 1, wherein at least one impurity comprises carbon monoxide (CO) and in that the concentration threshold is between 0.1 ppm and 10 ppm.

11. The method of claim 1, wherein at least one impurity comprises carbon monoxide (CO) and in that the concentration threshold is between 0.1 ppm and 0.3 ppm.

12. The method of claim 1, wherein at least one impurity comprises water ($H_2O$) and in that the concentration threshold is between 1 ppm and 100 ppm.

13. The method of claim 1, wherein at least one impurity comprises water ($H_2O$) and in that the concentration threshold is between 3 ppm and 7 ppm.

14. The method of claim 1, wherein the filling station comprising at least one compression component for compressing gaseous hydrogen supplied to the buffer container or to the tank.

15. A filling station for a pressurized gaseous hydrogen tank, comprising:
   at least one buffer container for containing pressurized gaseous hydrogen;
   a fluid circuit comprising a plurality of valves, an electronic logic controller for controlling the filling station and for controlling at least one valve, a first end intended to be connected to at least one source of gaseous hydrogen for the filling of the at least one buffer container with the hydrogen supplied by the at least one source, and a second end comprising a filling pipe intended to be removably connected to a tank in order to fill said tank from the at least one buffer container with gaseous hydrogen having a concentration of at least one given impurity that is below a given concentration threshold, the circuit being connected to said at least one buffer container; and
   at least one component for determining the current concentration of at least one impurity in the hydrogen in the buffer container during the filling thereof, wherein the electronic logic controller is adapted to:

receive and/or calculate the current concentration of impurity determined by the determining component, compare said current concentration of the impurity to a predetermined concentration threshold, and when the current concentration of the at least one impurity reaches said concentration threshold, stop the filling of said buffer container.

16. The station of claim 15, wherein the component for determining the current concentration comprises at least one sensor of the concentration of the impurity in the at least one source of hydrogen and/or in the fluid circuit of the filling station and at least one component for determining the amount of gas transferred in real time into the buffer container during the filling of the latter.

17. The station of claim 16, wherein the component for determining the amount of gas transferred into the buffer container comprises at least one from among: a flowmeter located in the circuit and a sensor for measuring the pressure in the buffer container.

* * * * *